US011465571B2

(12) United States Patent
Lee

(10) Patent No.: US 11,465,571 B2
(45) Date of Patent: Oct. 11, 2022

(54) STEERING APPARATUS OF VEHICLE

(71) Applicant: MANDO CORPORATION, Pyeongtaek-si (KR)

(72) Inventor: Gi Hyung Lee, Seoul (KR)

(73) Assignee: Mando Corporation, Pyeongtaek-si (KR)

(*) Notice: Subject to any disclaimer, the term of this patent is extended or adjusted under 35 U.S.C. 154(b) by 1203 days.

(21) Appl. No.: 15/964,237

(22) Filed: Apr. 27, 2018

(65) Prior Publication Data

US 2018/0334111 A1    Nov. 22, 2018

(30) Foreign Application Priority Data

May 22, 2017   (KR) .................. 10-2017-0062781

(51) Int. Cl.
| | | |
|---|---|---|
| *B60R 13/08* | (2006.01) | |
| *B62D 3/12* | (2006.01) | |
| *F16H 57/028* | (2012.01) | |
| *B62D 1/16* | (2006.01) | |
| *F16H 57/02* | (2012.01) | |

(52) U.S. Cl.
CPC ........ *B60R 13/083* (2013.01); *B60R 13/0884* (2013.01); *B62D 1/16* (2013.01); *B62D 3/12* (2013.01); *F16H 57/028* (2013.01); *F16H 2057/02082* (2013.01)

(58) Field of Classification Search
CPC .............. B60R 13/083; B60R 13/0815; B60R 13/0884; B60R 13/0853; B60R 13/0846; B62D 1/16; B62D 3/12; F16H 57/028; F16H 2057/02082; B60Y 2306/09
See application file for complete search history.

(56) References Cited

U.S. PATENT DOCUMENTS

| 5,557,078 A | 9/1996 | Holwerda |
|---|---|---|
| 2004/0256849 A1 | 12/2004 | Suzuki et al. |

(Continued)

FOREIGN PATENT DOCUMENTS

| CN | 201626471 U | 11/2010 |
|---|---|---|
| CN | 104627231 A | 5/2015 |

(Continued)

OTHER PUBLICATIONS

Takimoto Manabu, Machine Translation of JP 2014141183 A Obtained Jan. 6, 2022, Aug. 7, 2014, Entire Document. (Year: 2014).*

(Continued)

*Primary Examiner* — James A English
*Assistant Examiner* — Scott F. Underwood
(74) *Attorney, Agent, or Firm* — Morgan, Lewis & Bockius LLP

(57) ABSTRACT

A steering apparatus of a vehicle includes: a dust pack housing coupled to a top portion of a dust cap, which is combined with a rack housing to surround a pinion shaft, the dust pack housing disposed between and supporting a dash panel of the vehicle and the dust cap; and a noise attenuation member disposed between the dust pack housing and the pinion shaft and having plate shape so that an inner side of the noise attenuation member is spaced apart from the pinion shaft and an outer side of the noise attenuation member is fitted to the dust pack housing to attenuate noise that is transmitted to the inside of the dust panel.

19 Claims, 10 Drawing Sheets

(56) References Cited

U.S. PATENT DOCUMENTS

| | | | | |
|---|---|---|---|---|
| 2009/0115143 | A1* | 5/2009 | Park | B62D 1/16 |
| | | | | 277/650 |
| 2013/0240286 | A1* | 9/2013 | Asada | B62D 5/06 |
| | | | | 180/417 |

FOREIGN PATENT DOCUMENTS

| | | |
|---|---|---|
| CN | 205113418 U | 3/2016 |
| CN | 205524439 U | 8/2016 |
| DE | 10108903 A1 | 9/2002 |
| DE | 69727480 T2 | 12/2004 |
| DE | 10 2005 047 955 B3 | 6/2007 |
| DE | 10 2007 052 721 A1 | 5/2009 |
| DE | 102007046531 B3 | 5/2009 |
| DE | 102013224535 A1 | 6/2014 |
| DE | 10 2014 107 283 B4 | 9/2018 |
| FR | 2 796 903 A1 | 2/2001 |
| JP | 9-242880 A | 9/1997 |
| JP | 2005145235 A * | 6/2005 |
| JP | 2014-141183 A | 8/2014 |
| JP | 2019018730 A * | 2/2019 |
| KR | 10-2000-0022348 A | 4/2000 |
| KR | 10-2001-0029241 A | 4/2001 |
| KR | 100633951 B1 * | 10/2006 |
| KR | 1020140042150 A | 4/2014 |
| KR | 101701631 B1 * | 2/2017 |
| WO | WO-2018110764 A1 * 6/2018 | .......... F16C 11/0671 |

OTHER PUBLICATIONS

Ishikawa Zenichi, Machine Translation of JP H09242880 A Obtained Jan. 6, 2022, Sep. 16, 1997, Entire Document. (Year: 1997).*

Office Action issued in corresponding Korean Patent Application No. 10-2017-0062781, dated Jul. 19, 2021.

Office Action issued in Chinese Patent Application No. 201810485589.7 dated Mar. 19, 2021.

Office Action issued in corresponding German Patent Application No. 102018207167.5, dated Dec. 16, 2021.

* cited by examiner

STEERING APPARATUS OF VEHICLE

CROSS REFERENCE TO RELATED APPLICATION

This application claims priority to Korean Patent Application No. 10-2017-0062781, filed on May 22, 2017, which is hereby incorporated by reference for all purposes as if fully set forth herein.

TECHNICAL FIELD

The present disclosure relates to a steering apparatus of a vehicle, and more particularly, to a steering apparatus of a vehicle capable of preventing noise from being transmitted to inside of a dash panel.

BACKGROUND

In general, a steering apparatus includes: a pinion gear coupled to a lower end of a steering shaft to receive a rotational motion from the steering shaft; a lack bar engaged with the pinion gear and converting the rotational motion from the steering shaft into a straight motion; and a rack housing keeping the rack bar therein.

A dust pack housing, which supports a dust cap and a dash panel, is disposed on a top portion of the rack housing to prevent foreign substances such as dust or water from permeating into the rack housing from outside when a vehicle is driven or stopped.

However, in the general steering apparatus, noise generated by an engine room or a gear box under the dash panel and noise generated outside the vehicle leaks through a gap between the dust pack housing and the dash panel or is transmitted to inside of the dash panel through the dust pack housing, thereby disturbing a driver.

SUMMARY

The present disclosure has been proposed on the background described above, and an aspect of the present disclosure is to provide a steering apparatus of a vehicle capable of preventing noise from being transmitted to inside of a dash panel by primarily reducing noise, which is generated at an engine room, the outside of a vehicle, a gear box etc., through a dust pack housing and secondarily reducing the noise through a noise attenuation member.

Another aspect of the present disclosure is to provide a steering apparatus of a vehicle, capable of preventing noise from being transmitted to inside of a dash panel and removing unpleasantness that a driver feels due to noise by preventing noise from leaking through a noise attenuation member, using an anti-noise leakage member.

The present disclosure is not limited thereto and other aspects may be clearly understood by those skilled in the art from the following description.

According to an exemplary embodiment of the present disclosure, a steering apparatus of a vehicle includes: a dust pack housing coupled to a top portion of a dust cap, which is combined with a rack housing to surround a pinion shaft, the dust pack housing disposed between and supporting a dash panel of a vehicle and the dust cap; and a noise attenuation member disposed between the dust pack housing and the pinion shaft having a plate shape so that an inner side of the noise attenuation member is spaced apart from the pinion shaft and an outer side of the noise attenuation member is fitted to the dust pack housing to attenuate noise that is transmitted to the inside of the dust panel.

According to the exemplary embodiment of the present disclosure, it is possible to prevent noise from being transmitted to the inside of the dash panel by primarily attenuating noise generated at an engine room and a gear box and outside a vehicle through the dust pack housing and then secondarily attenuating the noise through the noise attenuation member.

Further, it is possible to prevent noise from being transmitted to the inside of the dash panel and removing unpleasantness that a driver feels due to noise by preventing noise from leaking through the noise attenuation member, using the anti-noise leakage member.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
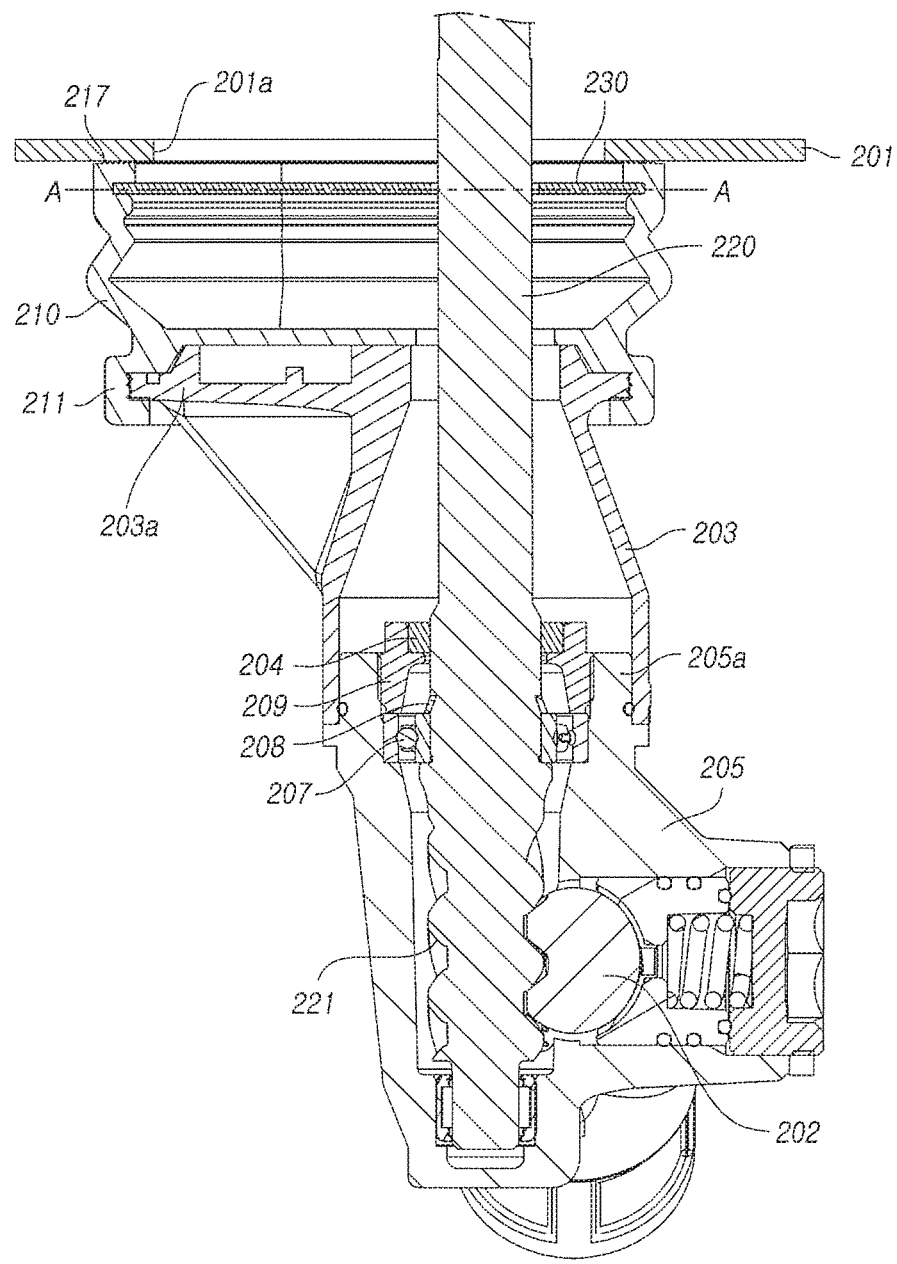
FIG. 1 is a cross-sectional view showing a steering apparatus of a vehicle according to an exemplary embodiment of the present disclosure.

Hereinafter, embodiments will be described in detail with reference to the accompanying drawings. In adding reference numerals to elements in each drawing, it should be noted that the same elements are designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
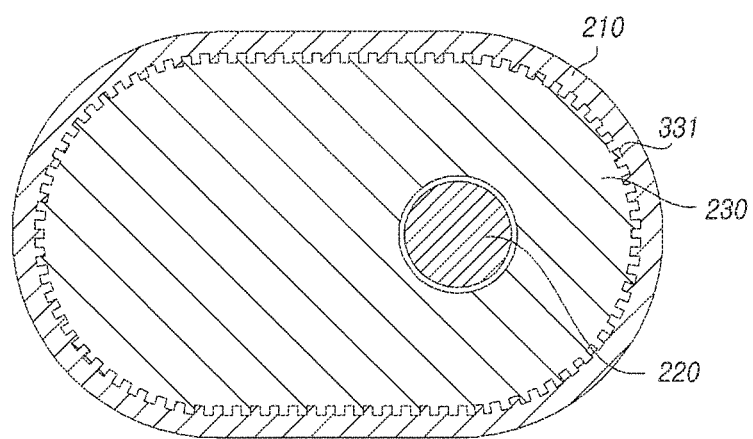
FIG. 2 is a cross-sectional view taken along line A-A shown in FIG. 1.
Figure 3:
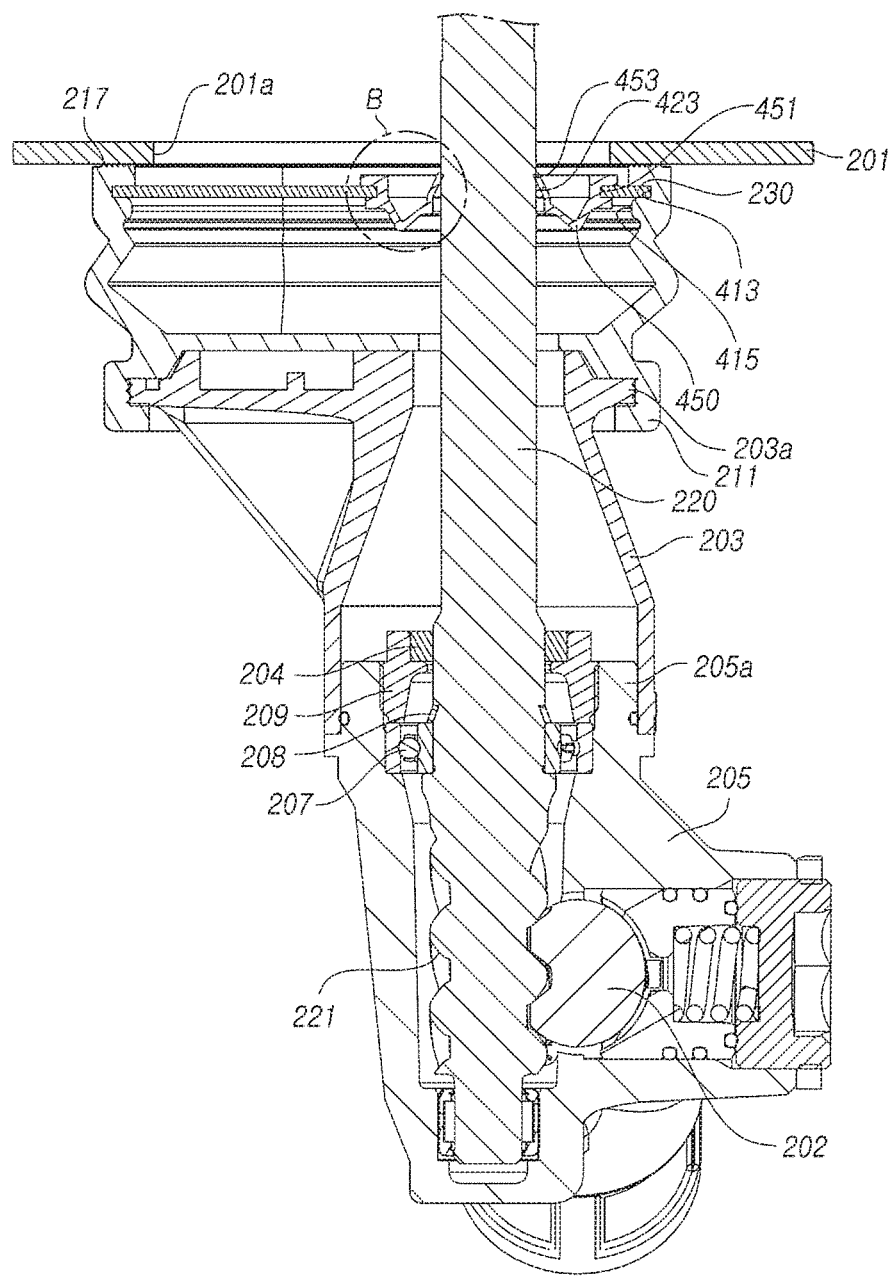
FIG. 3 is a cross-sectional view showing the steering apparatus of a vehicle according to an exemplary embodiment of the present disclosure.
Figure 4:
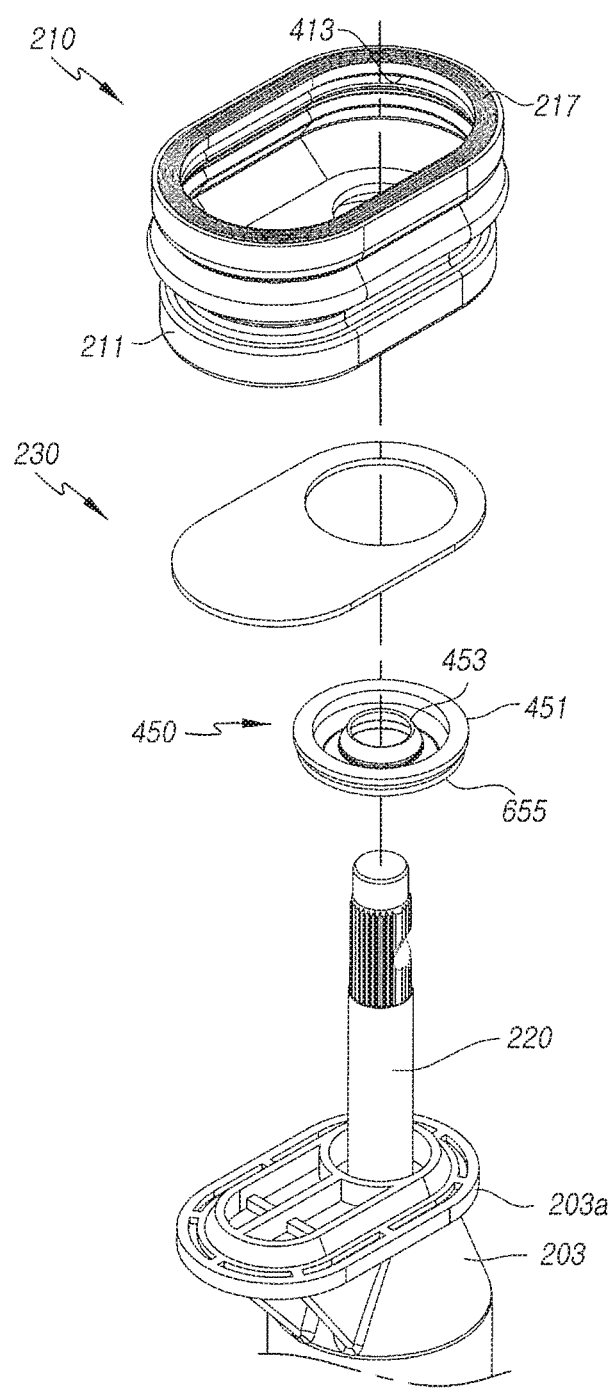
FIG. 4 is an exploded perspective view of FIG. 3.
Figure 5:
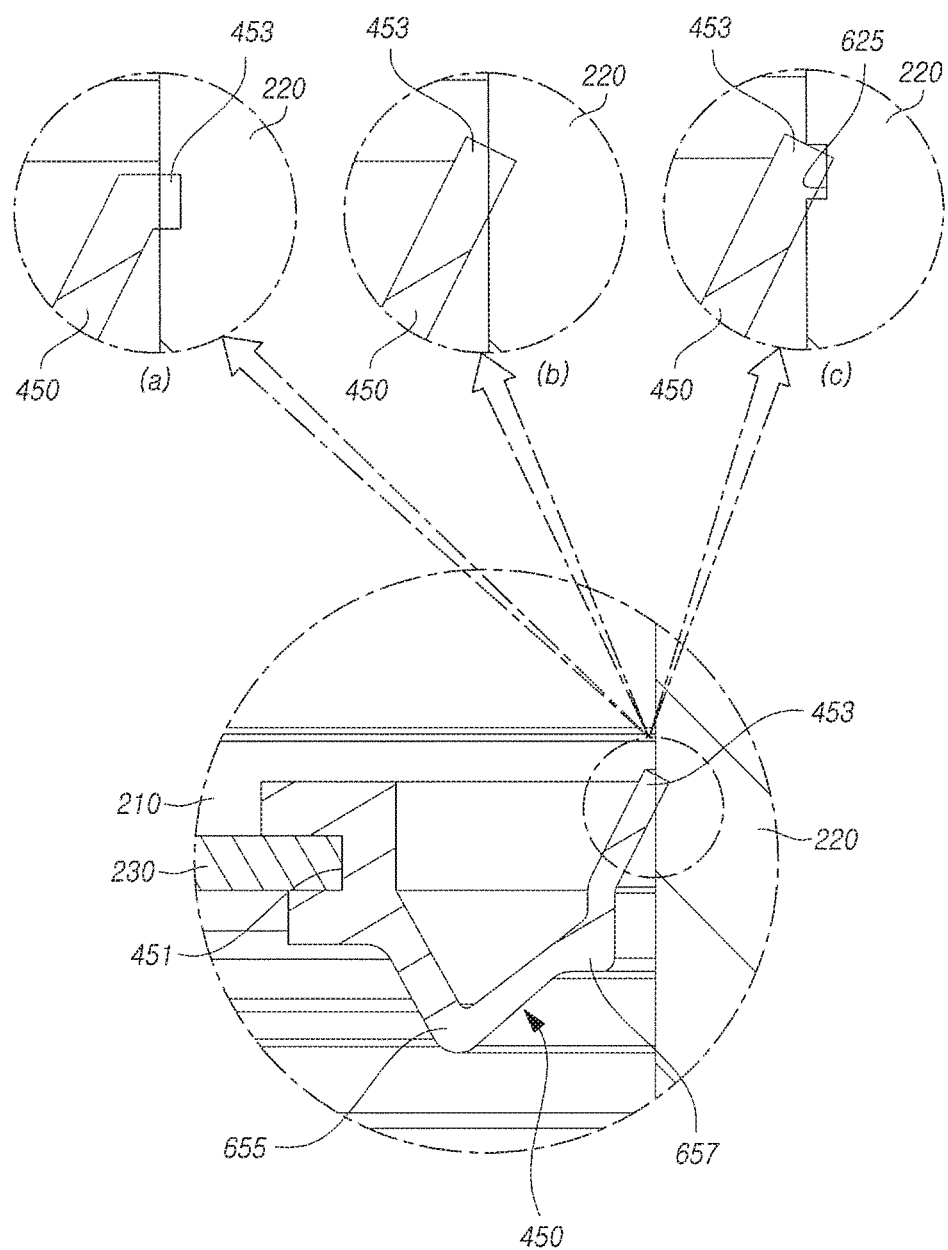
FIG. 5 is an enlarged cross-sectional view of the portion B shown in FIG. 3.

FIG. 1 is a cross-sectional view showing steering apparatus of a vehicle according to an exemplary embodiment of the present disclosure, FIG. 2 is a cross-sectional view taken along line A-A shown in FIG. 1, FIG. 3 is a cross-sectional view showing the steering apparatus of a vehicle according to an exemplary embodiment of the present disclosure, FIG. 4 is an exploded perspective view of FIG. 3, FIG. 5 is an enlarged cross-sectional view of the portion B shown in FIG. 3, and FIGS. 6 to 10 are cross-sectional views showing the steering apparatus of a vehicle according to an exemplary embodiment of the present disclosure.

As shown in the figures, a steering apparatus of a vehicle according to an exemplary embodiment of the present disclosure includes: a dust pack housing 210 coupled to a top portion of a dust cap 203 combined with a rack housing 205 to surround a pinion shaft 220, and supporting a dash panel 201 and the dust cap 203 therebetween; and a noise attenuation member 230 disposed between the dust pack housing 210 and having a plate shape with an inner side spaced from the pinion shaft 220 and an outer side fitted to the dust pack housing 210 in order to attenuate noise that is transmitted to inside the dust panel 201.

A pinion gear 221 formed at an end portion of the pinion shaft 220 and a rack bar 202 engaged with the pinion gear 221 to convert a rotational motion from the pinion shaft 220 into a straight motion are disposed at a lower portion in the rack housing 205.

The rack housing 205 has an opening 205a which can open upward and to which the dust cap 203 is coupled and fixed. A bearing 207 fitted on the pinion shaft 220 and a plug 209 supporting the bearing 207 are fitted on an inner side of the opening 205a.

The bearing 207 is disposed in the rack housing 205 and fitted on the outer side of the pinion shaft 220, thereby supporting the pinion shaft 220.

A stop ring 280 supports the bearing 207 and is fitted on the pinion shaft 220 with a side on the outer side of the pinion shaft 220 and the other side on a top portion of the bearing 207.

The plug 209 is disposed on the top portion of the bearing 207 to support the bearing 207 and is fitted on the inner side of the opening 205a of the rack housing 205 with the pinion shaft 220 inserted therethrough.

A dust seal 204 is fitted on the pinion shaft 220 in contact with an inner side of an upper portion of the plug 209.

The dust cap 203 has a hollow shape such that the pinion shaft 220 is inserted therethrough, that is, the dust cap 203 is coupled to the rack housing 205 at lower portion and to the dust pack housing 210 at an upper portion with the pinion shaft 220 inserted therethrough.

The dust cap 203 has a flange 203a protruding from an outer side of the upper portion of the dust cap 203 and the lower end of the dust pack housing 210 is coupled to the flange 203a.

The dust pack housing 210 is disposed between the dust cap 203 and the dash panel 201, thereby elastically supporting the dust cap 201 and the dash panel 201 and preventing dust or foreign substances from entering the rack housing 205.

The dust pack housing 210 has a first protrusion 217 protruding from a top portion of the dust pack housing 210 to be in contact with the dash panel 201, so that the dust pack housing 210 can elastically support the dash panel 201 and stably support the dust cap 203 and the dash panel 210 therebetween even if a gap between the dust cap 203 and the dash panel 201 is increased or decreased.

A plurality of first protrusions 217 may be formed on the top portion of the dust pack housing 210.

A flange seat 211, which has a groove shape, is formed on an inner side of the lower portion to support the flange 203a of the dust cap 203.

The noise attenuation member 230 having a plate shape is fitted in the dust pack housing 210 with a predetermined distance from the pinion shaft 220, thereby attenuating noise that is transmitted to the inside of the dash panel 201.

The noise attenuation member 230 is disposed between the dust pack housing 210 and the pinion shaft 220 and attenuates the noise that is generated at an engine room and a gear box and outside the vehicle and is transmitted to the inside of the dash panel 201, so that the noise is primarily attenuated by the dust pack housing 210 and secondarily attenuated by the noise attenuation member 230.

In other words, according to the related art, noise generated at an engine room and a gear box and outside a vehicle is transmitted to the dash panel 201 through the dust pack housing 210, and consequently, large noise is transmitted to the inside of the dash panel 210. However, according to the present disclosure, since the noise attenuation member 230 is disposed inside dust pack housing 210, noise is primarily attenuated by the dust pack housing 210 and secondarily attenuated by the noise attenuation member 201 and then transmitted to the dash panel 201. Therefore, noise that is transmitted to the inside of the dash panel 201 is reduced, as compared with the related art.

The noise attenuation member 230 is disposed inside the dust pack housing 210. For example, an insertion groove 413 is circumferentially formed on the inner side of the dust pack housing 210, and the noise attenuation member 230 is inserted in the insertion groove 413.

The noise attenuation member 230 is forcibly fitted in the insertion groove 413 to prevent a gap between the noise attenuation member 230 and the insertion groove 413.

A second protrusion 415 protrudes from an inner side of the dust pack housing 210 to support the noise attenuation member 230. Accordingly, the second protrusion 415 supports a bottom of the noise attenuation member 230 inserted in the insertion groove 413, so that the noise attenuation member 230 is stably retained in the dust pack housing 230 and the insertion area of the noise attenuation member 230 in the insertion groove 413 is increased.

Alternatively, the noise attenuation member 230 may be integrally formed with the dust pack housing 210 by injection molding, that is, the dust pack housing 210 and the noise attenuation member 230 may be integrally formed by injection-molding the dust pack housing 210 with the noise attenuation member 230 disposed in the mold of the dust pack housing 210.

Referring to FIG. 2 that is a cross-sectional view taken along line A-A shown in FIG. 1, a plurality of protrusive molding-coupling portions 331 may be formed on the outer side of the noise attenuation member 230 so that the dust pack housing 210 and the noise attenuation member 230 are more firmly combined each other.

The molding-coupling portions 331 increase the contact area of the noise attenuation member 230 and the dust pack housing 210 is injected between the molding-coupling portions 331, so that the dust pack housing 210 and the noise attenuation member 230 can be firmly combined with each other and are not separated after being combined.

A hollow anti-noise leakage member 450 supporting the pinion shaft 220 is coupled to the noise attenuation member 230 to increase the noise attenuation effect by the noise attenuation member 230, thereby removing the gap between the noise attenuation member 230 and the pinion shaft 220.

The anti-noise leakage member 450 is fitted in the noise attenuation member 230 in contact with the pinion shaft 220, so that the gap between the anti-noise leakage member 450 and the pinion shaft 220 is removed, whereby noise leakage through the gap between the anti-noise leakage member 450 and the pinion shaft 220 is prevented.

The anti-noise leakage member 450 support rotation and axial movement of the pinion shaft 220 and a surface-machined portion 423 is formed at the portion where the anti-noise leakage member 450 is supported on the outer side of the pinion shaft 220.

The surface-machined portion 423 of the pinion shaft 220 is formed by machining the portion where the anti-noise leakage member 450 is supported on the outer side of the pinion shaft 220 to reduce friction of the anti-noise leakage member 450 supported on the pinion shaft 220.

When noise is primarily attenuated by the dust pack housing 210 and secondarily attenuated by the noise attenuation member 230, the anti-noise leakage member 450 prevents noise leakage through the gap between the noise attenuation member 230 and the pinion shaft 220 by removing the gap, and the anti-noise leakage member 450 will be described below in detail with reference to FIG. 6.

A coupling portion 451 that is a groove is formed on the outer side of the anti-noise leakage member 450 so that the anti-noise leakage member 450 is coupled to the noise attenuation member 230 and supports the pinion shaft 220, and the noise attenuation member 230 is inserted in the coupling portion 451.

An outer diameter of the coupling portion 451 may be larger than an inner diameter of the noise attenuation member 230 so that the coupling portion 451 is in close contact with the noise attenuation member 230, and thus, the coupling portion 451 can be forcibly fitted in the noise attenuation member 230.

Further, a supporting portion 453 protrudes from the inner side of the anti-noise leakage member 450 to support the pinion shaft 220. Accordingly, the supporting portion 453 supports the surface-machined portion 423 of the pinion shaft 220, thereby supporting rotation and axial movement of the pinion shaft 220.

The inner diameter of the supporting portion 453 is smaller than the outer diameter of the pinion shaft 220 to be in close contact with the pinion shaft 220. Accordingly, the supporting portion 453 is forcibly fitted on the outer side of the pinion shaft 220, and thus, even supporting portion 453 is worn by rotation of the pinion shaft 220, a gap is not generated between the supporting portion 453 and the pinion shaft 220.

The supporting portion 453 may protrude radially inward from the anti-noise leakage member 450 to stably support the pinion shaft 220, as shown in (a) of FIG. 5, or it may be inclined and support the pinion shaft 220 to support rotation of the pinion shaft 220 with small friction on the pinion shaft 220, as shown in (b) of FIG. 5.

Since the supporting portion 453 of the anti-noise leakage member 450 supports rotation and axial movement of the pinion shaft 220, when rotational friction is generated between the support portion 453 and the pinion shaft 220 due to rotation of the pinion shaft 220 and axial friction is generated between the supporting portion 453 and the pinion shaft 220 due axial movement of the pinion shaft 220, the supporting portion 453 is worn much and it is disadvantageous in terms of durability.

Accordingly, the supporting portion 453 support rotation of the pinion shaft 220 and moves with the pinion shaft 220 while supporting the pinion shaft 220 when the pinion shaft 220 is axially moved. Further, a bending portion 655 bent upward or downward is formed between the coupling portion 451 and the supporting portion 453 of the anti-noise leakage member 450, and thus, the anti-noise leakage member 450 absorbs shock while supporting axial movement of the pinion shaft 220.

For example, a bending portion 655 bent downward between the coupling portion 451 and the supporting portion 453 is shown in the figures.

The bending portion 655 is smaller in thickness than the coupling portion 451 so that the supporting portion 453 supporting axial movement of the pinion shaft 220 can be easily deformed. Further, the bending portion 655 extends diagonally downward from the coupling portion 451 and then extends diagonally upward with the extending end supporting the outer side of the pinion shaft 220.

Accordingly, the supporting portion 453 can be easily deformed by deformation of the bending portion 655 and supports the pinion shaft 220, which is axially moved, by deforming.

The bending portion 655 of the anti-noise leakage member 450 has an assistant bending portion 657, so that the supporting portion 453 can more easily deform and more stably support the pinion shaft 220.

In other words, the assistant bending portion 657 is formed at the portion diagonally extending upward of the bending portion 655 and the supporting portion 453 can more stably support the pinion shaft 220 due to the assistant bending portion 657.

As shown in (b) of FIG. 5, the anti-noise leakage member 450 may be fitted on the pinion shaft 220 with the inner diameter of the supporting portion 453 increased, and as shown in (c) of FIG. 5, a seat 625 that is a groove may be formed on the pinion shaft 220 and the supporting portion 453 may be stably seated in the seat 625.

When the supporting portion 453 is seated in the seat 625, the supporting portion 453 can support rotation of the pinion shaft 220 at a fixed position, and thus, it is possible to prevent axial friction on the pinion shaft 220 and reduce the amount of wear accordingly.

A plurality of noise at members 230 may be provided to more efficiently attenuate noise generated at an engine room and a gear box and outside a vehicle, which are described below in detail with reference to FIGS. 6 to 8, in which two noise attenuation members 230 are shown for the convenience of description, but more noise attenuation members 230 may be provided.

When the plurality of noise attenuation members 230 for attenuating noise are provided, the manufacturing cost is reduced and the noise attenuation effect is increased, as compared with using a thick noise attenuation member 230.

Figure 6:
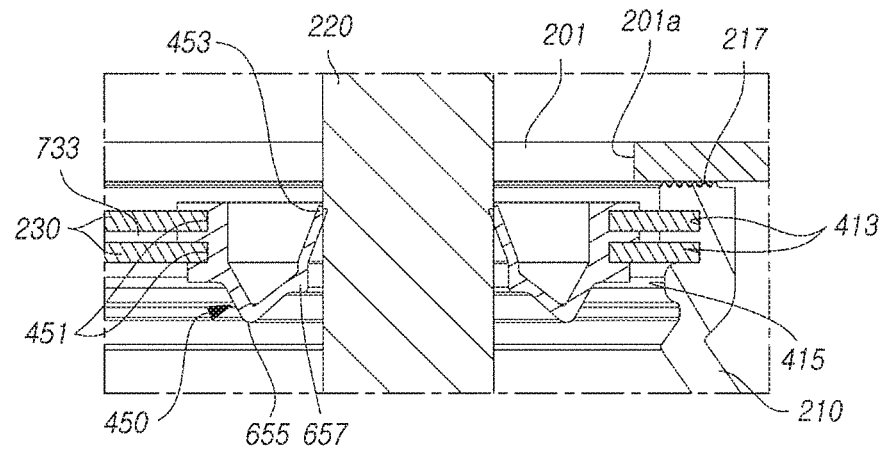
FIGS. 6 to 10 are cross-sectional views showing the steering apparatus of a vehicle according to an exemplary embodiment of the present disclosure.

Referring to FIG. 6, a space 733 is defined between a plurality of noise attenuation members 230 and forms an air layer between the noise attenuation members 230, thereby preventing noise transmission.

Since the space 733 is formed between the noise attenuation members 230, noise transmitted through the dust pack housing 210 is prevented from being sequentially transmitted through the noise attenuation member 230, the space 733, and the noise attenuation member 230 or from reflecting back to the inside of the dash panel 201.

Further, a plurality of insertion grooves 413 may be formed on the dust pack housing 210 to couple the noise attenuation members 230 and a plurality of coupling portions 451, which are grooves, may be also formed on the anti-noise leakage member 450, so that the noise attenuation members 230 are fitted in the insertion grooves 413 and the coupling portions 451.

Figure 7:
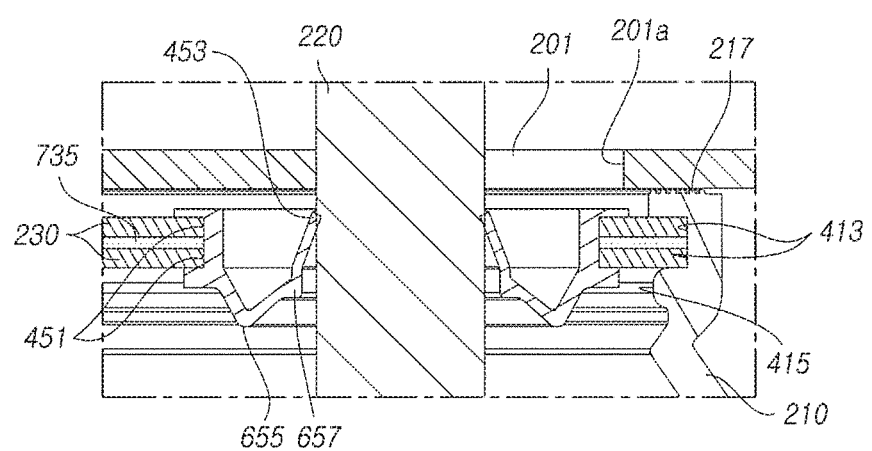
Figure 8:
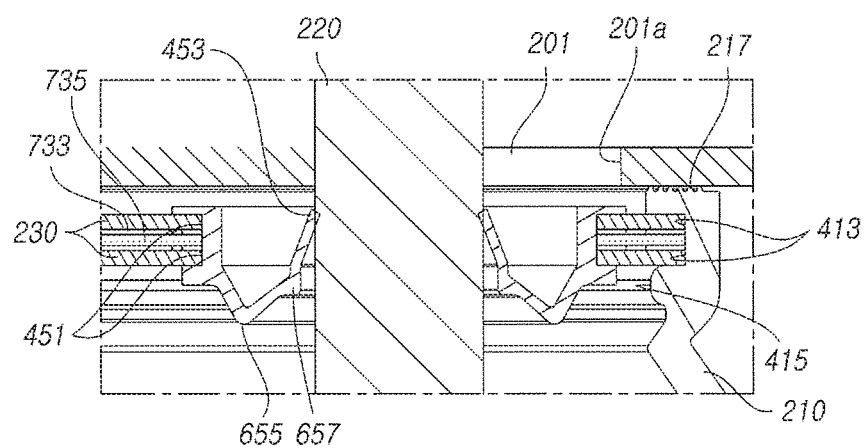

Further, referring to FIGS. 7 and 8, a noise-absorbing member 735 may be disposed between the noise attenuation members 230, and therefore, it is possible to more effectively attenuate noise that is transmitted to the inside of the dash panel 201.

For example, the noise-absorbing member 735 may be made of a different material from that of the noise attenuation members 230, or may be a porous noise-absorbing member having several holes formed on the surface or therein so that sound energy is converted into heat energy due to friction generated by vibration of the air in the holes due to sound waves, or may be a plate-shaped noise-absorbing member that allows sound waves to extinguish sound energy by vibrating the plate.

The noise-absorbing member 735 may be integrally formed with the noise attenuation members 230, as in FIG. 7 or spaces 733 may be defined between the noise-absorbing member 735 and the noise attenuation members 230, as shown in FIG. 8. Further, when the spaces 733 are defined, noise cannot travel through the air layers in the spaces 733, and thus, it is prevented from being transmitted to the inside of the dash panel 201.

Figure 9:
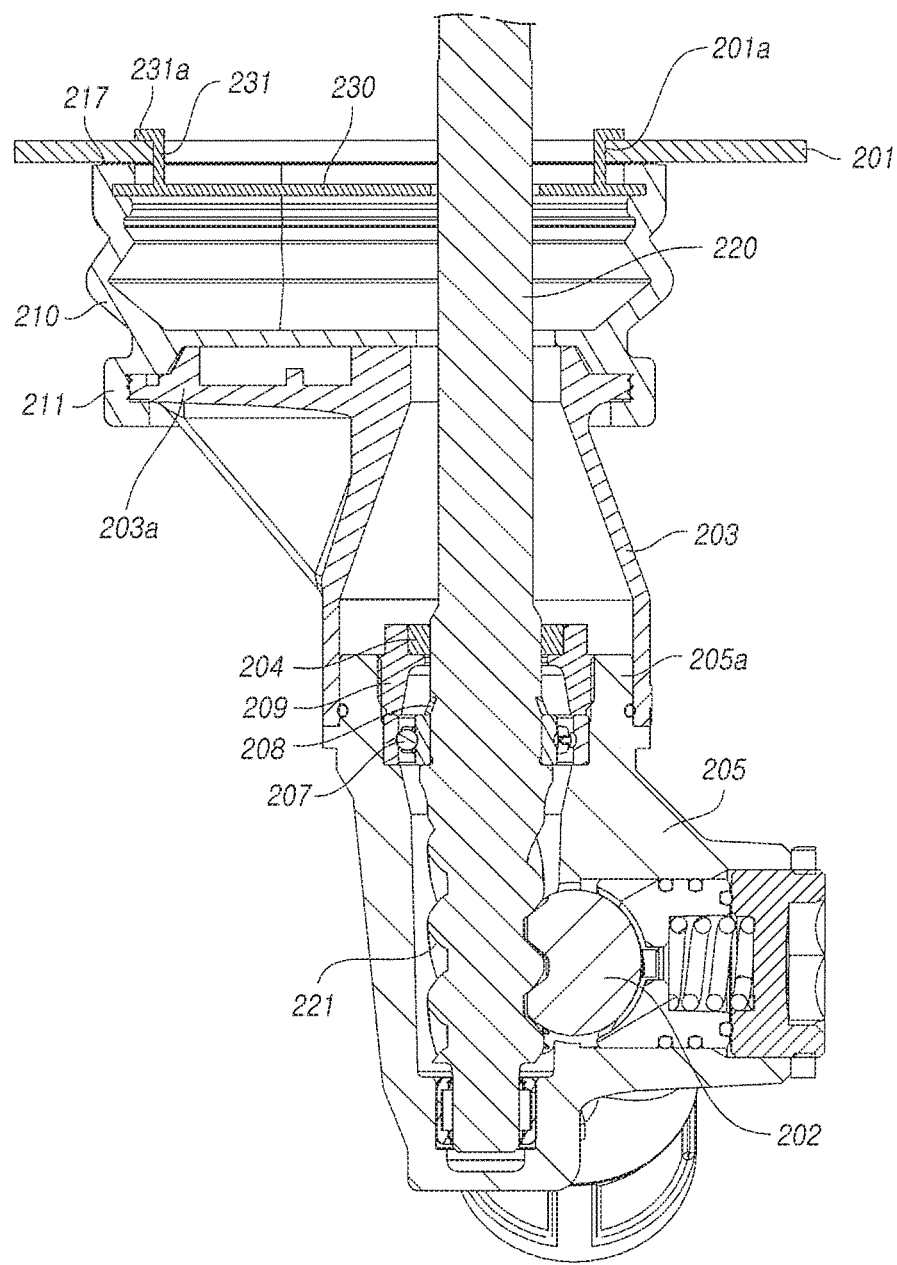
Figure 10:
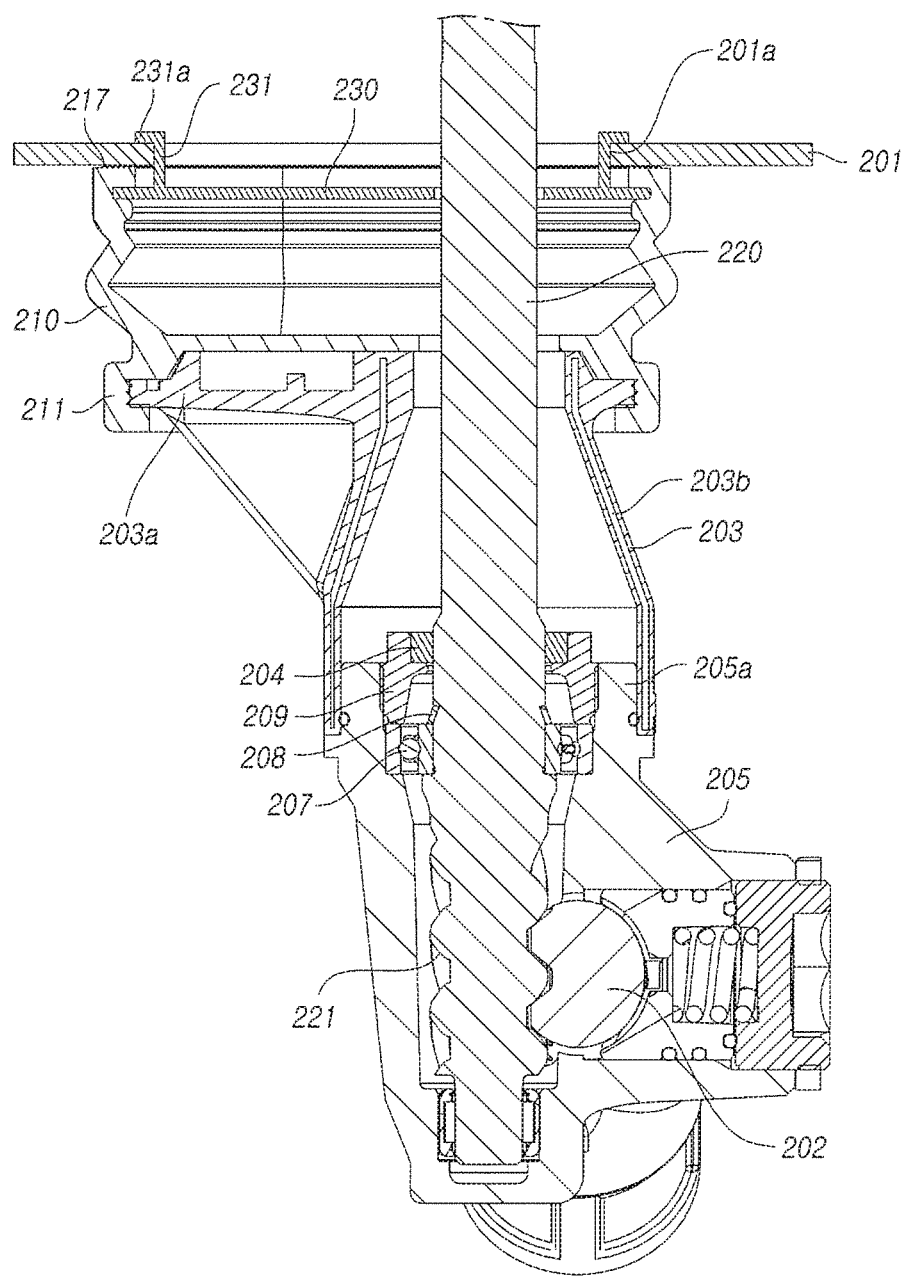

Further, as shown in FIGS. 9 and 10, an extending protrusion 231 protruding and extending toward the dash panel 201 may be formed on the top of the noise attenuation member 230 and fitted in a mounting hole 201a of the clash panel 210 to reduce noise that is transmitted to the inside through the dust pack housing 210 and the dash panel 201.

A locking end 231a radially bending is formed at an end of the extending protrusion 231 and supports a top portion of the dash panel 201 in close contact with the edges of the mounting hole 201a to reduce noise that is transmitted to the inside through the mounting hole 201a of the dash panel 201.

Further, as shown in FIG. 10, an empty space 203b may be formed between the outer side and the inner side of the dust cap 203 or the noise-absorbing member 735 may be disposed between the outer side and the inner side of the dust cap 203 in order to reduce the noise that is transmitted to the inside through the dust cap 203.

The empty space 203b generates an effect of preventing noise from traveling through the air layer and the noise-absorbing member 735 attenuates noise that is transmitted from the outer side to the inner side of the dust cap 203, in which the material and shape of the noise-absorbing member 735 are the same as those described above, and thus, they are not described here.

According to the exemplary embodiments having the shape and structure described above, it is possible to prevent noise from being transmitted to the inside of the dash panel by primarily attenuating noise generated at an engine room and a gear box and outside a vehicle through the dust pack housing and then secondarily attenuating the noise through the noise attenuation member.

Further, it is possible to prevent noise from being transmitted to the inside of the dash panel and removing unpleasantness that a driver feels due to noise by preventing noise from leaking through the noise attenuation member, using the anti-noise leakage member.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A steering apparatus of a vehicle, the steering apparatus comprising:
   a dust pack housing coupled to a top portion of a dust cap which is combined with a rack housing to surround a pinion shaft, the dust pack housing disposed between and supporting a dash panel of the vehicle and the dust cap; and
   a noise attenuation member disposed between the dust pack housing and the pinion shaft, the noise attenuation member having a plate shape so that an inner side of the noise attenuation member is spaced apart from the pinion shaft and an outer side of the noise attenuation member is fitted to the dust pack housing to attenuate noise that is transmitted to inside the dash panel,
   wherein the noise attenuation member includes a plurality of protrusive molding-coupling portions on the outer side of the noise attenuation member so that the dust pack housing and the noise attenuation member are fixed to each other.

2. The steering apparatus of claim 1, wherein the dust pack housing includes an insertion groove circumferentially grooved in an inner side of the dust pack housing so that the noise attenuation member is inserted in the insertion groove.

3. The steering apparatus of claim 2, wherein the dust pack housing includes a second protrusion protruding from the inner side of the dust pack housing to support the noise attenuation member.

4. The steering apparatus of claim 1, wherein the noise attenuation member is integrally combined with the dust pack housing by injection molding.

5. The steering apparatus of claim 1, further comprising a hollow anti-noise leakage member coupled to the noise attenuation member and supporting the pinion shaft to remove a gap between the noise attenuation member and the pinion shaft.

6. The steering apparatus of claim 5, wherein the pinion shaft includes a surface-machined portion at the portion where the anti-noise leakage member is supported on an outer side of the pinion shaft.

7. The steering apparatus of claim 5, wherein a plurality of noise attenuation members are disposed between the dust pack housing and the anti-noise leakage member.

8. The steering apparatus of claim 7, wherein the plurality of noise attenuation members are spaced apart from each other.

9. The steering apparatus of claim 7, further comprising a noise-absorbing member between the plurality of noise attenuation members.

10. The steering apparatus of claim 9, wherein the plurality of noise attenuation members and the noise-absorbing member are integrally combined.

11. The steering apparatus of claim 9, wherein the plurality of noise attenuation members and the noise-absorbing member are spaced apart from each other.

12. The steering apparatus of claim 5, wherein the anti-noise leakage member has a coupling portion grooved on an outer side of the anti-noise leakage member so that the noise attenuation member is inserted in the coupling portion.

13. The steering apparatus of claim 12, further comprising a supporting portion protruding from an inner side of the anti-noise leakage member to support the pinion shaft.

14. The steering apparatus of claim 13, further comprising a bending portion bending upward or downward between the coupling portion and the supporting portion of the anti-noise leakage member, the bending portion supporting movement of the pinion shaft.

15. The steering apparatus of claim 13, wherein the pinion shaft includes a seat grooved on the pinion shaft so that an end of the supporting portion is inserted in the seat.

16. The steering apparatus of claim 1, wherein the dust pack housing includes a first protrusion protruding on a top portion of the dust pack housing and contacting the dash panel to elastically support the dash panel.

17. A steering apparatus of a vehicle, the steering apparatus comprising:
  a dust pack housing coupled to a top portion of a dust cap which is combined with a rack housing to surround a pinion shaft, the dust pack housing disposed between and supporting a dash panel of the vehicle and the dust cap; and
  a noise attenuation member disposed between the dust pack housing and the pinion shaft, the noise attenuation member having a plate shape so that an inner side of the noise attenuation member is spaced apart from the pinion shaft and an outer side of the noise attenuation member is fitted to the dust pack housing to attenuation noise that is transmitted to inside the dash panel,
  wherein the noise attenuation member includes an extending protrusion protruding and extending toward the dash panel and fitted in a mounting hole of the dash panel on a top portion of the noise attenuation member.

18. The steering apparatus of claim 17, wherein the extending protrusion has a locking end radially bending at an end of the extending protrusion, the locking end supporting a top portion of the dash panel.

19. A steering apparatus of a vehicle, the steering apparatus comprising:
  a dust pack housing coupled to a top portion of a dust cap which is combined with a rack housing to surround a pinion shaft, the dust pack housing disposed between and supporting a dash panel of the vehicle and the dust cap, and
  a noise attenutation member disposed between the dust pack housing and the pinion shaft, the noise attenuation member having a plate shape so that an inner side of the noise attenuation member is spaced apart from the pinion shaft and an outer side of the noise attenuation member is fitted to the dust pack housing to attenuate noise that is transmitted to inside the dash panel,
  wherein the dust cap includes an outer side and an inner side, which are spaced apart from each other or includes a noise-absorbing member disposed between the outer side and the inner side of the dust cap.

* * * * *